United States Patent
Harris

(10) Patent No.: US 7,415,041 B2
(45) Date of Patent: Aug. 19, 2008

(54) METHOD AND APPARATUS FOR DECODING DATA IN A WIRELESS COMMUNICATION SYSTEM

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 424 days.

(21) Appl. No.: 11/026,740

(22) Filed: Dec. 31, 2004

(65) Prior Publication Data

US 2006/0146757 A1    Jul. 6, 2006

(51) Int. Cl.
*H04J 3/22* (2006.01)
(52) U.S. Cl. ............... 370/469; 455/414.1; 455/550.1; 370/338; 714/52; 714/751; 714/799
(58) Field of Classification Search ............... 370/235, 370/311, 335, 338; 455/522, 414.4, 550.1; 714/748, 52, 749, 751, 752, 799
See application file for complete search history.

(56) References Cited

U.S. PATENT DOCUMENTS

| | | | | |
|---|---|---|---|---|
| 5,371,734 A | * | 12/1994 | Fischer | 370/311 |
| 5,844,918 A | * | 12/1998 | Kato | 714/751 |
| 6,668,349 B1 | * | 12/2003 | Sawaguchi | 714/755 |
| 6,934,318 B2 | * | 8/2005 | Sarkar | 375/141 |
| 2003/0207696 A1 | * | 11/2003 | Willenegger et al. | 455/522 |
| 2005/0105614 A1 | * | 5/2005 | Katsavounidis et al. | 375/240.06 |
| 2005/0147040 A1 | * | 7/2005 | Vayanos et al. | 370/235 |

* cited by examiner

*Primary Examiner*—William Trost
*Assistant Examiner*—James D Ewart
(74) *Attorney, Agent, or Firm*—Steven A. May

(57) ABSTRACT

A communication system is provided that utilizes an apriori knowledge of padding when decoding a received frame and when allocating power to a transmitted frame. In one embodiment, a receiver utilizes an apriori knowledge of padding in decoding a received frame. When the frame is likely to include padding bits, the receiver utilizes its knowledge of the padding bits to properly decode the frame. In another embodiment, a transmitter may take advantage of an apriori knowledge of padding to allocate a first power level to a padded portion of a frame and allocating a second power level to a non-padded portion of the frame.

16 Claims, 4 Drawing Sheets

METHOD AND APPARATUS FOR DECODING DATA IN A WIRELESS COMMUNICATION SYSTEM

FIELD OF THE INVENTION

The present invention relates generally to wireless communication systems, and, in particular, to a decoding of data in a wireless communication system.

BACKGROUND OF THE INVENTION

When information, such as voice or data, is received by a wireless communication device, such as a mobile station or a base transceiver station, the information is digitized, if not already in a digital format, and processed by one or more tasks performed by a respective processor of the communication device. The digitized data is then processed pursuant to a known protocol scheme.

A layered representation of protocols is commonly known as a protocol stack. A protocol stack commonly used for the interconnection of network systems is the TCP/IP Suite, named for two of the protocols, Transmission Control Protocol (TCP) and Internet Protocol (IP), in the stack. The TCP/IP protocol stack includes five layers, which layers are, from highest to lowest, an Application Layer, a Transport Layer, a Network Layer, a Link Layer, and a Physical Layer.

When the Link Layer, that is, Layer 2, functionality assembles a frame for transmission over a wireless link, the layer adds padding, typically a string of predetermined bits that convey no real information, such as a string of zeros (0's), to the frame if there is an insufficient amount of payload to fill out the frame. A result is that it is not unusual for a frame transmitted in a wireless communication system to contain a significant amount of padding. For example, reverse or forward link frames may contain as much as 20% to 50% padding, and more if header compression is used. More particularly, Radio Link Protocol (RLP)/Radio Link Control (RLC) control frames, particularly frames transmitted in a reverse link DCCH (Dedicated Control Channel), typically include more than 50% padding. For example, reverse and forward link RLP IDLE, NAK, and FILL frames constitute approximately 70% to 90% of the frames transferred and, typically, approximately the last 140 bits are padding, that is, all zeros. Other examples of reverse link messages that typically include significant padding are origination and page response messages (approximately 20% padding) and mobile station acknowledgements (approximately 90% padding).

Layer 2 functionality further implements protocols that assure a reliable transmission of data in a communication system that guarantees delivery of data. In order to assure a reliable transmission, Layer 2 may implement RLP/RLC or other automatic repeat request (ARQ) scheme to retransmit frames of data that were lost over the radio interface. A reliable Transport Layer protocol, such as TCP, may use RLP/RLC to guarantee that messages reach their destination complete and uncorrupted and in the order they were sent.

As is known in the art, wireless propagation of a frame may introduce errors to the data of the frame. When a reliable transport protocol is used and a receiving communication device is unable to correctly decode a received frame, a corresponding transmitting communication device retransmits the incorrectly received frame. For example, a receiving communication device that is unable to correctly decode a received frame may transmit a NAK to the transmitting communication device that identifies the erroneous frame. In response to receiving the NAK, the transmitting communication device retransmits the frame. By way of another example, a receiving communication device that is able to correctly decode a received frame may transmit an ACK to the transmitting communication device that identifies the correctly decoded frame. When a transmitting communication device fails to receive an ACK for a particular frame within a predetermined period of time, the transmitting communication device retransmits the frame.

A result is that frames that are erroneously received and that cannot be properly decoded are retransmitted, consuming valuable bandwidth and system capacity. However, when a transmitted frame includes significant padding, which contains no real information, errors that occur in the padding may cause a retransmission of the frame while being of no consequence to the information being conveyed.

Therefore a need exists for a method and an apparatus that minimizes a retransmission of erroneously received frames that include padding.

DETAILED DESCRIPTION OF THE INVENTION

To address the need for a method and an apparatus that minimizes a retransmission of frames that include padding, a communication system is provided that utilizes an apriori knowledge of padding when decoding a received frame and when allocating power to a transmitted frame. In one embodiment, a receiver utilizes an apriori knowledge of padding in decoding a received frame. When the frame is likely to include padding bits, the receiver utilizes its knowledge of the padding bits to properly decode the frame. In another embodiment, a transmitter may take advantage of an apriori knowledge of padding to allocate a first power level to a padded portion of a frame and allocating a second power level to a non-padded portion of the frame.

Generally, an embodiment of the present invention encompasses a method for decoding frames in a wireless communication system. The method includes receiving a frame, determining whether the frame likely comprises padding bits, and decoding the frame based on the determination that the frame likely comprises padding bits.

Another embodiment of the present invention encompasses a method for allocating power to an encoded frame in a wireless communication system. The method includes receiving a frame for transmission via an air interface and determining whether the frame is likely to comprise padding.

The method further includes, in response to determining that the frame is likely to comprise padding, determining a portion of the frame comprising the padding and allocating a first power level to the portion of the frame comprising the padding that is less than a second power level allocated to a portion of the frame not comprising padding.

Yet another embodiment of the present invention encompasses a communication device capable of decoding frames in a wireless communication system. The communication device includes means for receiving a frame, means for determining whether the frame likely comprises padding bits, and means for decoding the frame based on the determination that the frame likely comprises padding bits.

Still another embodiment of the present invention encompasses a communication device for allocating power to an encoded frame in a wireless communication system. The communication device includes means for receiving a frame for transmission via an air interface and means for determining whether the frame is likely to comprise padding. The communication device further includes means for determining, in response to determining that the frame is likely to comprise padding, a portion of the frame comprising the padding and means for allocating a first power level to the portion of the frame comprising the padding that is less than a second power level allocated to a portion of the frame not comprising padding.

Figure 1:
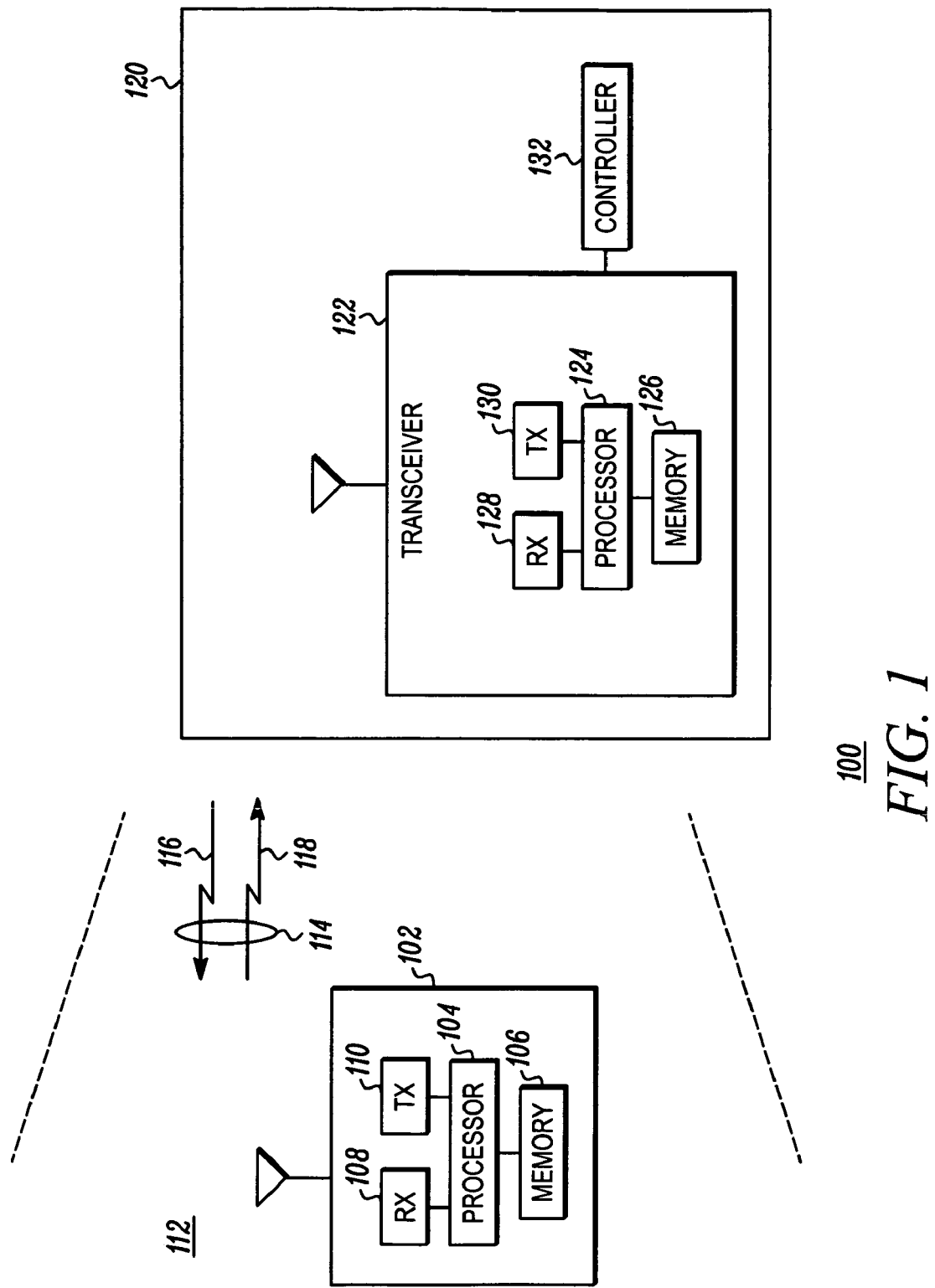
FIG. 1 is a block diagram of a wireless communication system in accordance with an embodiment of the present invention.

The present invention may be more fully described with reference to FIGS. 1-5. FIG. 1 is a block diagram of a wireless communication system 100 in accordance with an embodiment of the present invention. In one embodiment of the present inventions, communication system 100 provides wireless communications according to a communication technology utilizing code division multiple access (CDMA) such as, IS-95 and 95B, IS-2000, CDMA2000, CDMA1X, CDMA1xEV-DO, CDMA1xEV-DV, and the like. However, those who are of ordinary skill in the art realize that communication system 100 may operate in accordance with any one of a variety of wireless packet data communication systems, such as but not limited to Global System for Mobile Communications (GSM), later generations of the GSM architecture, such as General Packet Radio Service (GPRS), Enhanced Data for Global Evolution (EDGE), and Universal Mobile Telecommunication Service (UMTS), or Fourth Generation (4G) systems such as OFDM (Orthogonal Frequency Division Multiple Access).

Still referring to FIG. 1, communication system 100 includes a wireless access network 120, such as a Radio Access Network (RAN) or a Base Station (BS), that provides voice and/or data to be wirelessly communicated to and/or from a mobile station (MS) 102, such as but not limited to a cellular phone, a radiotelephone, or a wireless communication-enabled personal computer, laptop computer, or personal digital assistant (PDA), in wireless communication with. Access network 120 includes at least one transceiver 122, such as a Base Transceiver Station (BTS) or a Node B, that is operably coupled to a controller 132, such as a Base Station Controller (BSC) or a Radio Network Controller (RNC).

Access network 120 provides communications services to mobile stations, such as MS 102, located in a coverage area 112 serviced by the access network via an air interface 114. Air interface 114 includes a forward link 116 having multiple logical and transport channels including at least one forward link traffic channel and at least one forward link signaling channel, such as an FCCCH (Forward Common Control Channel) and/or a BCCH (Broadcast Control Channel). The forward link may or may not further include a paging channel, such as a PCH (Paging Channel). For example, in a CDMA 2000 1XEV-DO communication system, the paging function is performed using a Route Update Protocol. Air interface 114 further includes an reverse link 118 having multiple logical and transport channels including at least one reverse link traffic channel, such as an FCH (Fundamental Channel), at least one reverse link signaling channel, such as a DCCH (Dedicated Control Channel), and an access channel, such as an ACH (Access Channel) or an EACH (Enhanced Access Channel).

Each of MS 102 and transceiver 122 includes a respective processor 104, 124, such as one or more microprocessors, microcontrollers, digital signal processors (DSPs), combinations thereof or such other devices known to those having ordinary skill in the art. The particular operations/functions of processors 104 and 124, and respectively thus of MS 102 and transceiver 122, are determined by an execution of software instructions and routines that are stored in a respective at least one memory device 106, 126, associated with the processor, such as random access memory (RAM), dynamic random access memory (DRAM), and/or read only memory (ROM) or equivalents thereof, that store data and programs that may be executed by the corresponding processor. Each of at least one memory device 106 and 126 further maintains a predetermined pattern of padding bits for each of multiple different frame types. Each of the predetermined patterns of padding bits may be used by the associated processor 104, 124 to pad a corresponding frame type when the processor is assembling, or decoding, such a frame. For example, for each of reverse or forward link RLP IDLE, NAK, and FILL frames, each of at least one memory devices 106 and 126 may maintain a pattern of approximately 140 bits, such as a string of zeros, that may be inserted as padding in the last 140 bits of such frames. By way of further example, each of at least one memory devices 106 and 126 may further maintain predetermined bit patterns that may be used as padding in origination and page response frames and MS acknowledgements. Each of MS 102 and transceiver 122 further comprises a respective receiver 108, 128 and a respective transmitter 110, 130 that are each coupled to the respective processor 104, 124. Unless otherwise specified herein, the functions performed by each of MS 102, transceiver 122, and controller 132 are performed by the respective processor 104, 124, and 134 of the MS, transceiver, and controller.

The embodiments of the present invention preferably are implemented within MS 102 and transceiver 122, and more particularly with or in software programs and instructions stored in the respective at least one memory device 106, 126, and executed by respective processors 108, 128. The invention as described in the embodiments herein may be applied to the reverse link when the receiver functionality described here is implemented at transceiver 122, and invention as described in the embodiments herein may be applied to the forward link when the receiver functionality described here is implemented at MS 102. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the wireless communication devices MS 102 and transceiver 122. Based on the present disclosure, one skilled in the art will be readily capable of producing and implementing such software and/or hardware without undo experimentation.

When information, such as voice, user data, or control data, is received by a wireless communication device, such as MS 102 or transceiver 122, for transmission via air interface 114, the information is demodulated and digitized, if not already in a digital format, and processed by one or more tasks performed by respective processors 104 and 124. The digitized data is then processed pursuant to the wireless communication technology employed by system 100 and a known protocol scheme. Similarly, when an instruction to convey a known control message is received by the wireless communication device, the wireless communication device assembles the control message pursuant to the wireless communication technology employed and the known protocol scheme.

At the level of interconnected network systems, such as system 100, protocol schemes have been developed to facilitate the exchange of data among multiple elements of the system. A protocol scheme specifies the manner of interpreting every data bit of a data packet exchanged across the networks. In order to simplify network designs, several well-known techniques of layering the protocols have been developed. Protocol layering divides the network design into functional layers and then assigns separate protocols to perform each layer's task. By using protocol layering, the protocols are kept simple, each with a few well-defined tasks. The protocols can then be assembled into a useful whole, and individual protocols can be removed or replaced as needed.

A layered representation of protocols is commonly known as a protocol stack. Preferably, communication system 100 uses the well-known TCP/IP protocol stack, although one of ordinary skill in the art realizes that any protocol stack that implements reliable communications may be used herein. The TCP/IP protocol stack includes, from highest to lowest, an Application Layer, a Transport Layer, a Network Layer, a Link Layer, and a Physical Layer. Layer 2 that is, the Link Layer or Data-Link Layer, provides the functional and procedural means to transfer data between network entities and to detect and possibly correct errors that may occur in the Physical Layer. Layer 2 implements protocols that assure a reliable transmission of data in a communication system that guarantees delivery of data. In order to assure a reliable transmission, Layer 2 may implement Radio Link Protocol (RLP)/Radio Link Control (RLC) or another known automatic repeat request (ARQ) scheme to retransmit frames of data that were lost over the radio interface. A reliable protocol, such as TCP, may use RLP/RLC to guarantee that messages reach their destination complete and uncorrupted and in the order they were sent.

Figure 2:
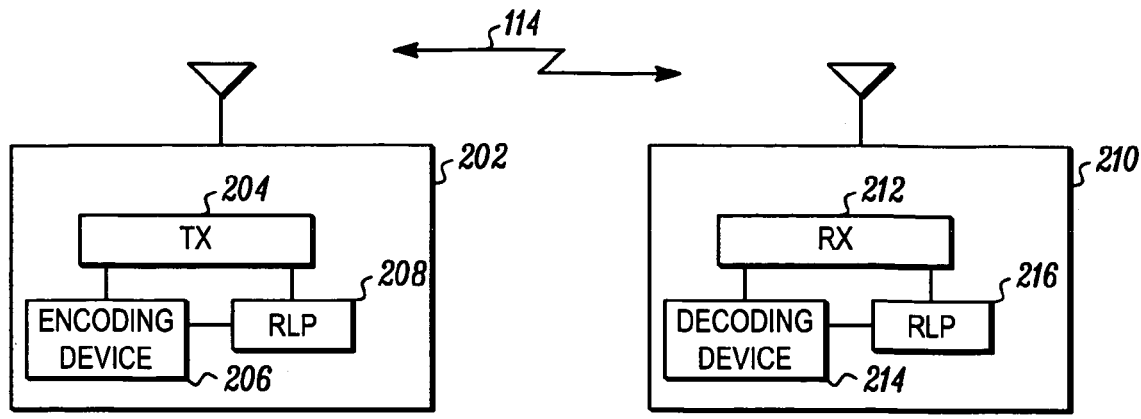
FIG. 2 is a block diagram of a receiving communication device and a transmitting communication device capable of operating in the communication system of FIG. 1 in accordance with an embodiment of the present invention.

FIG. 2 is a block diagram 200 of a transmitting communication device 202 and a receiving communication device 210 of communication system 100 in accordance with an embodiment of the present invention. Each of MS 102 and transceiver 122 may function as either transmitting communication device 202 or receiving communication device 210 when operating in communication system 100. Transmitting communication device 202 and receiving communication device 210 are each configured to enable the use of downlink 116 and uplink 118 of air interface 114 and to provide reliable wireless communication. As such, each of transmitting communication device 202 and receiving communication device 210 can be configured to verify an accuracy of received frames, to request or provide a retransmission of incorrectly received or decoded frames, and further to distinguish between good frames, erased frames, and DTXs.

Transmitting communication device 202 includes a wireless transmitter 204, an encoding device 206, and a Radio Link Protocol (RLP) generator 208. Each of elements 206 and 208 may be implemented in a processor of the transmitting device, such as processors 104 and 124 of MS 102 and transceiver 122, based on software stored in an associated at least one memory device 106, 126, or may be implemented in hardware in a manner as can readily be determined by one of ordinary skill in the art.

RLP generator 208 receives data from a data source, such as digitized voice data for a device user or application layer data from a data application such as an external personal computer (not shown) or a mobile data application, for example, a wireless access protocol (WAP) browser (not shown), voice-over-IP application, or a dispatch application. RLP generator 208 performs Layer 2 functionality on the data, such as framing the data into RLP data frames and appending sequentially increasing RLP sequence numbers to the frames for transmission of the frames. RLP generator 208 may further append information that identifies the type of frame being conveyed, for example by use of a frame type data field, such as Layer 2 frames such as an RLP IDLE frame, a NAK frame, or a FILL frame, and further identifies an amount of padding potentially conveyed, for example by use of a data length data field. When the data received by RLP generator 208 is not sufficient to fill the frame, the RLP generator may add padding, preferably a predetermined bit string such as a string of zeros (0's), to the frame in order to fill out the frame. For example, the data received by RLP generator 208 may not be sufficient to completely fill a single frame, or may not be sufficient to fill an integer number of frames, leaving a last frame only partially filled.

Encoding device 206 typically includes a coder (not shown), such as a convolutional or turbo coder, that encodes the frame pursuant to a known coding scheme. Encoding device 206 further includes a cyclic redundancy check (CRC) block (not shown) that generates and applies overhead bits to the frames framed by the source application to provide for error protection of the frames. The encoded data is then forwarded to transmitter 204, where the encoded data may be interleaved, spread by a spreading code, modulated onto a carrier, and amplified to produce an output signal that is transmitted to receiving communication device 210 via an air interface, such as air interface 114.

Receiving communication device 210 includes a wireless receiver 212, a decoding device 214, and an RLP receiver 216. Each of elements 214 and 216 may be implemented in a processor of the transmitting device, such as processors 104 and 124 of MS 102 and transceiver 122, based on software stored in an associated at least one memory device 106, 126, or may be implemented in hardware in a manner as can readily be determined by one of ordinary skill in the art.

Wireless receiver 212 receives the transmitted output signal and demodulates, despreads, and de-interleaves the received signal. The resulting signal is forwarded to decoding device 214. Decoding device 214 typically includes a decoder (not shown), such as a convolutional or turbo decoder, that decodes the frame pursuant to a coding scheme utilized by FEC processing device 206. Decoding device 214 further includes and a cyclic redundancy check (CRC) block that performs error detection and correction on received frames decoding device 214 can detect and correct errors introduced to the transmitted signal by air interface 114, thereby recovering original input data, or in other words the original data bits and frames, even when a significant number of errors are present in the received data.

RLP receiver 216 performs Layer 2 functionality on the received frames. In particular, RLP receiver 216 recovers decoded frames from decoding device 214 if the recovered frames have been correctly decoded. RLP receiver 216 further reconstructs original transmitted data based on the RLP sequence numbers. If RLP receiver 216 detects a missing sequence number, or if a frame has not been correctly decoded, the RLP receiver can request retransmission by sending or causing to be sent a NAK to the transmitting communication device, for example, to the MS 102 if detected by transceiver 122, or to the transceiver if detected by the MS. RLP receiver 216 passes the good frames containing user data to a user application, such as an email server, Internet or personal computer (not shown) via intermediate circuitry.

In the prior art, when a decoder detects errors introduced to a received signal by a corresponding air interface and is unable to correct the errors and recover the original data bits and frame, the frame is designated as erased. A corresponding RLP receiver may then request a retransmission of the frame or may fail to acknowledge the frame, resulting in a retransmission of the frame. However, when the received frame includes significant padding, which contains no real information, the decoder does not distinguish the padding from the user information and errors that occur in the padding may cause the RLP receiver to cause a retransmission of the frame even though the errors are of no consequence to the information being conveyed.

Figure 3:
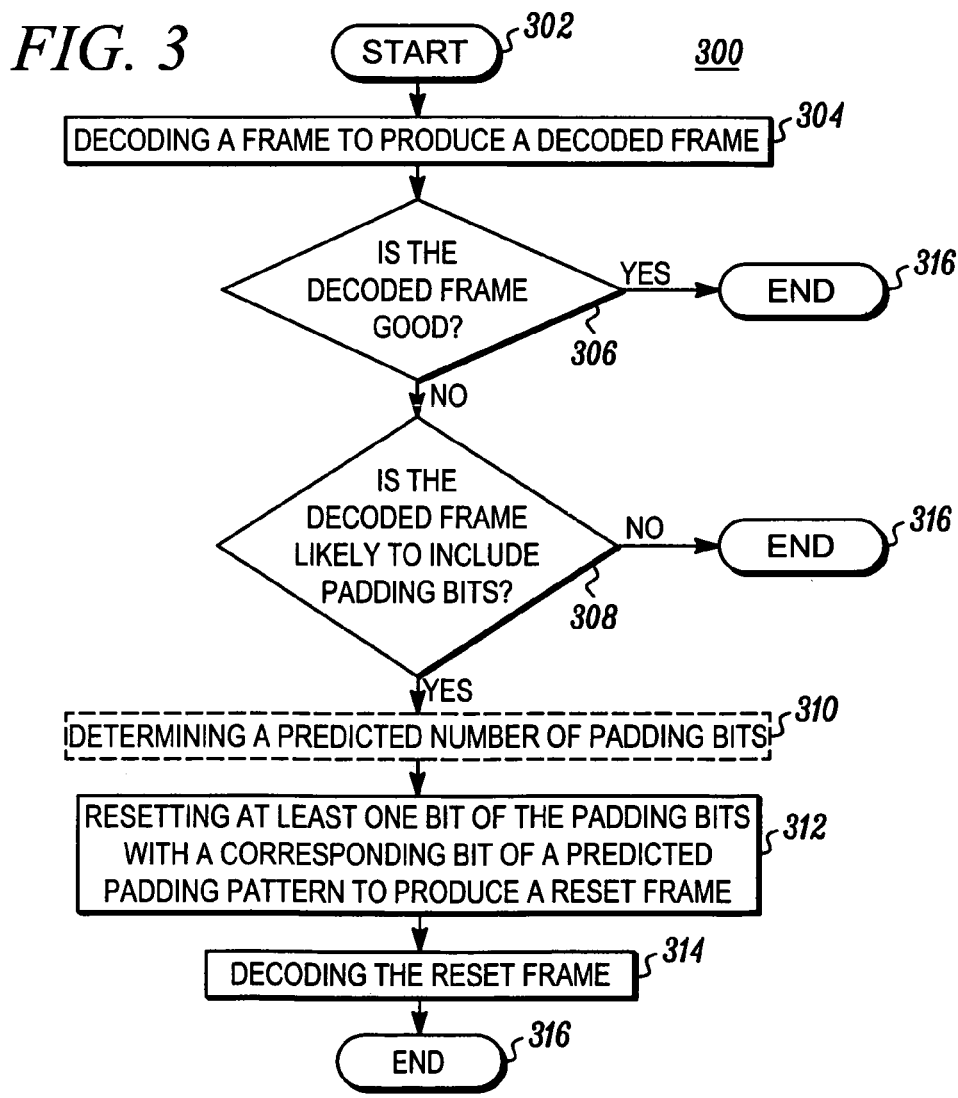
FIG. 3 is a logic flow diagram of a method executed by the receiving communication device of FIG. 2 in decoding a received frame in accordance with various embodiments of the present invention.

In order to reduce the waste of bandwidth and system capacity due to retransmissions of padded frames, communication system 100 decodes a received frame based on an apriori knowledge of the padding that may be used in the frame. FIG. 3 is a logic flow diagram 300 of the method executed by receiving communication device 210 in decoding a received frame in accordance with various embodiments of the present invention. Logic flow diagram 300 begins (302) when decoding device 214 decodes (304) a frame to produce a decoded frame. As part of the decoding, decoding device 214 further performs error detection, such as a cyclic redundancy check (CRC), and correction on the frame and determines associated frame quality information as is well-known in the art.

Decoding device 214 then determines (306), based on the decoded frame and associated frame quality information, whether the frame has been correctly decoded. When decoding device 214 determines (306) that the frame is good, that is, has been correctly decoded, then logic flow 300 ends (318). When decoding device 214 determines (306) that the frame has not been correctly decoded, then the decoding device further determines (308) whether the frame is more likely than not to include padding bits. In one embodiment of the present invention, decoding device 214 may determine whether the frame is likely to include padding bits by evaluating a header of the frame. Based on the header, decoding device 214 may then determine whether the frame is likely to include padding. For example, decoding device 214 may evaluate a Layer 2 frame type data field of the header to determine whether the frame is of a type, such as a Layer 2 control frame, that is likely to include padding. By way of another example, decoding device 214 may evaluate a Layer 2 length data field of a header to determine whether the frame is likely to include padding, as the frame length may indicate whether the frame is of a type likely to include padding or whether padding has been added to the frame.

For example, frames conveyed via reverse link 118 or forward link 116 may contain as much as 20% to 50% padding, and more if header compression is used. More particularly, Layer 2 control frames, such as RLP/RLC control frames, particularly frames transmitted in a DCCH of reverse link 118, typically include more than 50% padding. For example, reverse link RLP IDLE, NAK, and FILL frames typically constitute approximately 70% to 90% of the frames transferred in a reverse link such as reverse link 118 and, typically, approximately the last 140 bits of such frames are padding, that is, all zeros. Other examples of frames conveyed via reverse link 118 that typically include significant padding are origination and page response frames (typically approximately 20% padding) and mobile station acknowledgements (typically approximately 90% padding).

In another embodiment of the present invention, decoding device 214 may determine whether the frame is likely to include padding bits by correlating strings of decoded bits of the frame with predetermined bit patterns maintained in an associated at least one memory device, such as at least one memory devices 106 and 126. To expedite the correlation, decoding device 214 may only correlate the last tail bits of the frame corresponding, in length, to a length of each predetermined bit pattern. Based on the correlations, decoding device 214 then determines whether a string of decoded bits correlates to one of the predetermined bit patterns. When no such correlation is strong, then decoding device 214 may determine that frame is not likely to include padding bits. When a correlation is strong between the decoded bits of the frame and one of the predetermined bit patterns, then decoding device 214 may determine that frame is likely to include padding bits. What constitutes a strong correlation is up to a designer of communication system 100, who needs to balance the benefits from decoding properly reset frames versus the cost of decoding improperly reset frames.

When decoding device 214 determines (308) that the frame is not likely to include padding, then logic flow 300 ends (316). When decoding device 214 determines (308) the frame is likely to include padding, for example, that the frame is of a type that generally includes padding, or when there is a strong correlation between the padding bits and a predetermined bit pattern, then the decoding device 214 may further determine (310) a predicted number of padding bits based on the header. Again, for example, for reverse link RLP IDLE, NAK, and FILL frames, approximately the last 140 bits of such frames are padding, that is, all zeros. By way of further example, origination and page response messages typically include approximately 20% padding and MS acknowledgements typically include approximately 90% padding.

Decoding device 214, preferably based on the predicted number of padding bits, then resets (312) at least one bit of the padding bits to a corresponding bit of the associated predetermined padding pattern to produce a reset frame that comprises the predetermined padding pattern. For example, decoding device 214 may reset the at least one bit to a corresponding bit of the predetermined pattern, such as a string of zeros, used for padding in that type of frame or to a corresponding bit of the predetermined pattern with the strong correlation. For example, bits may be analyzed on a bit-by-bit basis to determine which bits to replace to produce the reset frame, or the padding bits may be replaced in their entirety by the predetermined padding pattern. In another embodiment of the present invention and in order to avoid an excessive number of re-decodings of frames, the step of resetting may further comprise the following steps. Decoding device 214 may determine a fraction that the predicted padding bits constitute of the total number of bits in the frame, or of a payload data field of the frame. Decoding device 214 may then compare this fraction to a threshold, for example 90%, to produce a comparison. Based on the comparison, and more particularly, when the fraction exceeds the threshold, the predicted padding bits may be reset to the predicted padding pattern. In response to resetting the predicted padding bits to the predicted padding pattern, decoding device 214 conveys the reset frame to decoding device 214.

Decoding device 214 then decodes (314) the reset frame. As part of the decoding, decoding device 214 further performs error detection, such as a cyclic redundancy check (CRC), and correction on the reset frame and determines associated frame quality information as is well-known in the art. Logic flow 300 then ends (316).

Figure 4:
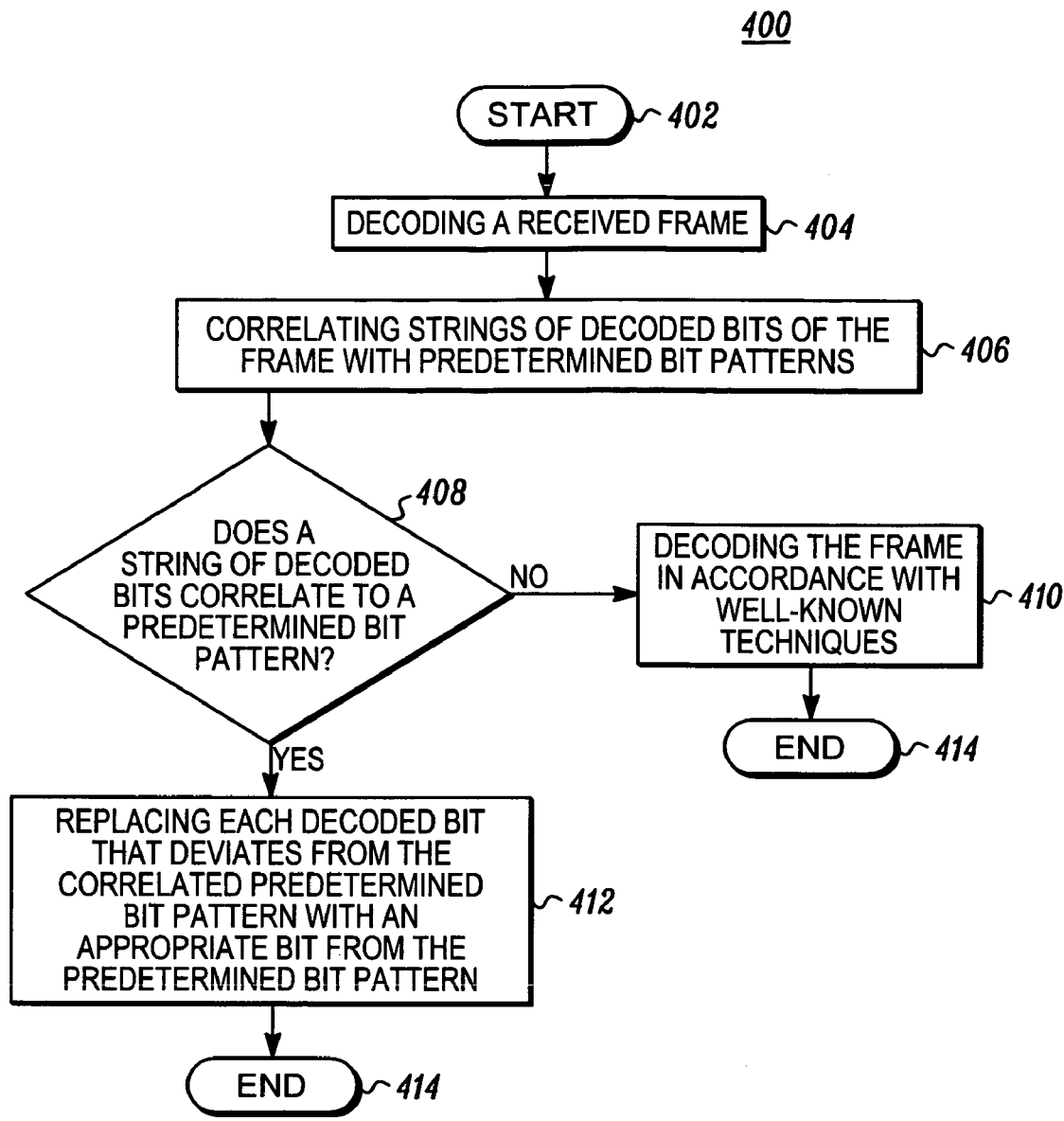
FIG. 4 is a logic flow diagram of a method executed by the receiving communication device of FIG. 2 in decoding a received frame in accordance with another embodiment of the present invention.

In another embodiment of the present invention, decoding device 214 may take advantage of an apriori knowledge of padding when initially decoding a received frame. FIG. 4 is a logic flow diagram 400 of a method executed by receiving communication device 210 in decoding a received frame in accordance with the another embodiment of the present invention. Logic flow diagram 400 begins (402) when decoding device 214 initiates (404) a decoding of a received frame. As part of the decoding, decoding device 214 correlates (406) strings of decoded bits of the frame with predetermined bit patterns maintained in an associated at least one memory device, such as at least one memory devices 106 and 126. In order to expedite the correlation, decoding device 214 may only correlate the last tail bits of the frame corresponding, in length, to the length of the predetermined bit pattern.

Based on the correlations, decoding device 214 determines (408) whether a string of decoded bits correlates to one of the predetermined bit patterns. When no such correlation is strong, then decoding device 214 continues to decode (410) the frame in accordance with well-known techniques and logic flow 400 ends (414). When such a correlation is strong, then decoding device 214 replaces (412) each decoded bit that deviates from the strongly correlated predetermined bit pattern with an appropriate bit from the predetermined bit pattern to produce a corrected frame. Decoding device 214 then performs error detection, such as a cyclic redundancy check (CRC), and correction on the corrected frame and determines associated frame quality information as is well-known in the art. Logic flow 400 then ends (414).

Figure 5:
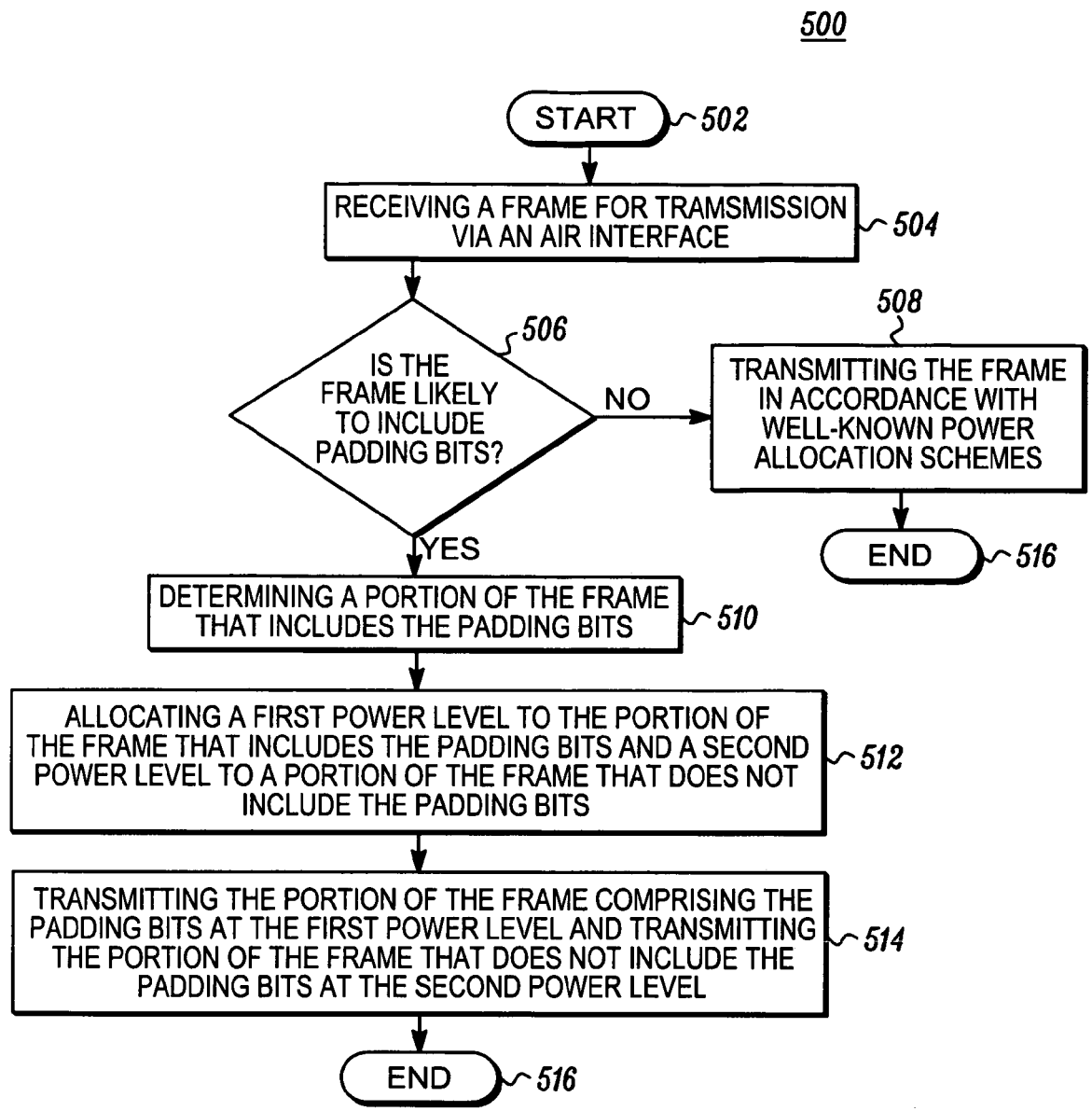
FIG. 5 is a logic flow diagram of a method executed by the transmitting communication device of FIG. 2 in transmitting a coded frame in accordance with another embodiment of the present invention.

In yet another embodiment of the present invention, a wireless transmitter 204, such as transmitters 110 and 130, may take advantage of an apriori knowledge of padding when transmitting an assembled frame. FIG. 5 is a logic flow diagram 500 of a method executed by transmitting communication device 202 in transmitting a coded frame in accordance with the yet another embodiment of the present invention. Logic flow diagram 500 begins (502) when transmitting communication device 202, and in particular, wireless transmitter 204 of the transmitting communication device, receives (504) a frame for transmission via an air interface, such as air interface 114. Based on the header of the frame and with reference to an associated processor 104, 124, transmitter 204 determines (506) whether the frame is likely to include padding bits. For example, transmitter 204 may determine whether the frame is of a frame type that is likely to include padding bits or is of a length that indicates an inclusion of padding bits.

When transmitter 204 determines (506) that the frame is not likely to include padding, then the transmitter transmits (508) the frame in accordance with well-known transmit power allocation schemes and logic flow 500 ends (516). When transmitter 204 determines (506) that the frame is likely to include padding, then the transmitter further determines (510), with reference to the associated processor 104, 124, a portion of the frame that includes that padding bits, that is, a location of the padding bits in the frame. Transmitter 204 then allocates (512) a first power level to the portion of the frame that includes the padding bits and allocates a second power level to another portion of the frame that does not include the padding bits. As logic flow diagrams 300 and 400 provide improved methods for correctly decoding padded portions of a frame, the padded portion of the frame may be acceptably received even when incurring greater transmission errors than the non-padded portion of the frame. Accordingly, the first power level, allocated to the padded portion of the frame, may be less than the second power level, allocated to the non-padded portion of the frame. For example, power may be allocated such that a power level allocated to the padding bits is less than a power level allocated to user data or header data comprising useful informational content. Transmitter 204 then transmits (514) the padded portion of the frame at the first power level, while transmitting the non-padded portion of the frame at the second power level. Logic flow 500 then ends (516).

By utilizing an apriori knowledge of padding when decoding a received frame and when allocating power to a transmitted frame, communication system 100 conserves system bandwidth and reduces potential interference in air interface 114. An apriori knowledge of padding is used to replace bits in a received frame and thereby improve the likelihood that the frame will be correctly decoded. By improving the likelihood that the frame will be correctly decoded, the likelihood that the frame will be retransmitted is reduced and system bandwidth is conserved. An apriori knowledge of padding also is used to allocate power to a padded portion and a non-padded portion of a frame, thereby reducing an average amount of power allocated to the frame, which reduces the potential for interference resulting from transmission of the frame and frees up transmit power for allocation elsewhere.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for decoding frames in a wireless communication system comprising:
   receiving a frame;
   determining whether the frame likely comprises padding bits;
   decoding the received frame;
   determining whether the decoded frame has been correctly decoded;
   in response to determining that the decoded frame has been incorrectly decoded and determining that the decoded frame likely comprises padding bits, resetting the padding bits to a predetermined bit pattern to produce a reset frame; and error checking the reset frame.

2. The method of claim 1, wherein determining whether the frame likely comprises padding bits comprises evaluating a header of the frame.

3. The method of claim 2, wherein evaluating a header of the frame comprises evaluating a frame type data field of the header.

4. The method of claim 2, wherein evaluating a header of the frame comprises evaluating a Layer 2 frame header.

5. The method of claim 2, wherein evaluating a header of the frame comprises evaluating a length header.

6. The method of claim 2, wherein evaluating a header of the frame comprises:

determining, based on the header, whether the frame likely comprises padding bits;

in response to determining that the frame likely comprises padding bits, determining a fraction of the frame comprising padding bits;

comparing the determined fraction to a threshold to produce a comparison; and determining whether to re-decode the frame based on the comparison.

7. The method of claim 1, wherein decoding comprises performing a cyclic redundancy check of the received frame.

8. The method of claim 1, wherein determining whether the frame likely comprises padding bits comprises:

determining whether a string of decoded bits correlates to a predetermined bit pattern; and wherein decoding comprises, in response to determining that a string of decoded bits correlates to a predetermined bit pattern, replacing at least one bit of the string of bits with a bit from the predetermined bit pattern to produce a reset frame and decoding the reset frame.

9. A communication device capable of decoding frames in a wireless communication system comprising:

means for receiving a frame;

means for determining whether the frame likely comprises padding bits;

means for decoding the received frame;

means for determining whether the decoded frame has been correctly decoded;

means for, in response to determining that the decoded frame has been incorrectly decoded and determining whether the frame likely comprises padding bits, resetting the padding bits to a predetermined bit pattern to produce a reset frame; and means for error checking the reset frame.

10. The communication device of claim 9, wherein the means for determining whether the frame likely comprises padding bits evaluates a header of the frame.

11. The communication device of claim 10, wherein the means for determining whether the frame likely comprises padding bits evaluates a frame type data field of the header of the frame.

12. The communication device of claim 10, wherein the means for determining whether the frame likely comprises padding bits comprises:

means for determining, based on the header, whether the frame likely comprises padding bits;

means for determining, in response to determining that the frame likely comprises padding bits, a fraction of the frame comprising padding bits;

means for comparing the determined fraction to a threshold to produce a comparison; and means for determining whether to re-decode the frame based on the comparison.

13. The communication device of claim 9, wherein the means for decoding comprises means for performing a cyclic redundancy check of the received frame.

14. The communication device of claim 9, wherein means for determining whether the frame likely comprises padding bits comprises:

means for determining whether a string of decoded bits correlates to a predetermined bit pattern; and wherein the means for decoding comprises means for replacing, in response to determining that a string of decoded bits correlates to a predetermined bit pattern, at least one bit of the string of bits with a bit from the predetermined bit pattern.

15. A method for decoding frames in a wireless communication system comprising:

receiving a frame;

determining whether the received frame likely comprises padding bits;

in response to determining that the decoded frame likely comprises padding bits and prior to performing an error detection test on the frame, replacing one or more padding bits with a bit from a predetermined bit pattern to produce a corrected frame; and performing the error detection test on the corrected frame.

16. The method of claim 15, wherein determining whether the received frame likely comprises padding bits comprises decoding the received frame and correlating strings of decoded bits of the frame with the predetermined bit pattern and wherein replacing comprises, when the correlation is not strong, replacing one or more padding bits with a bit from the predetermined bit pattern.

* * * * *